Oct. 14, 1952 J. A. CHENICEK 2,614,137
PRODUCTION OF SELECTIVE OLEFINIC POLYMERS
Filed Nov. 28, 1947
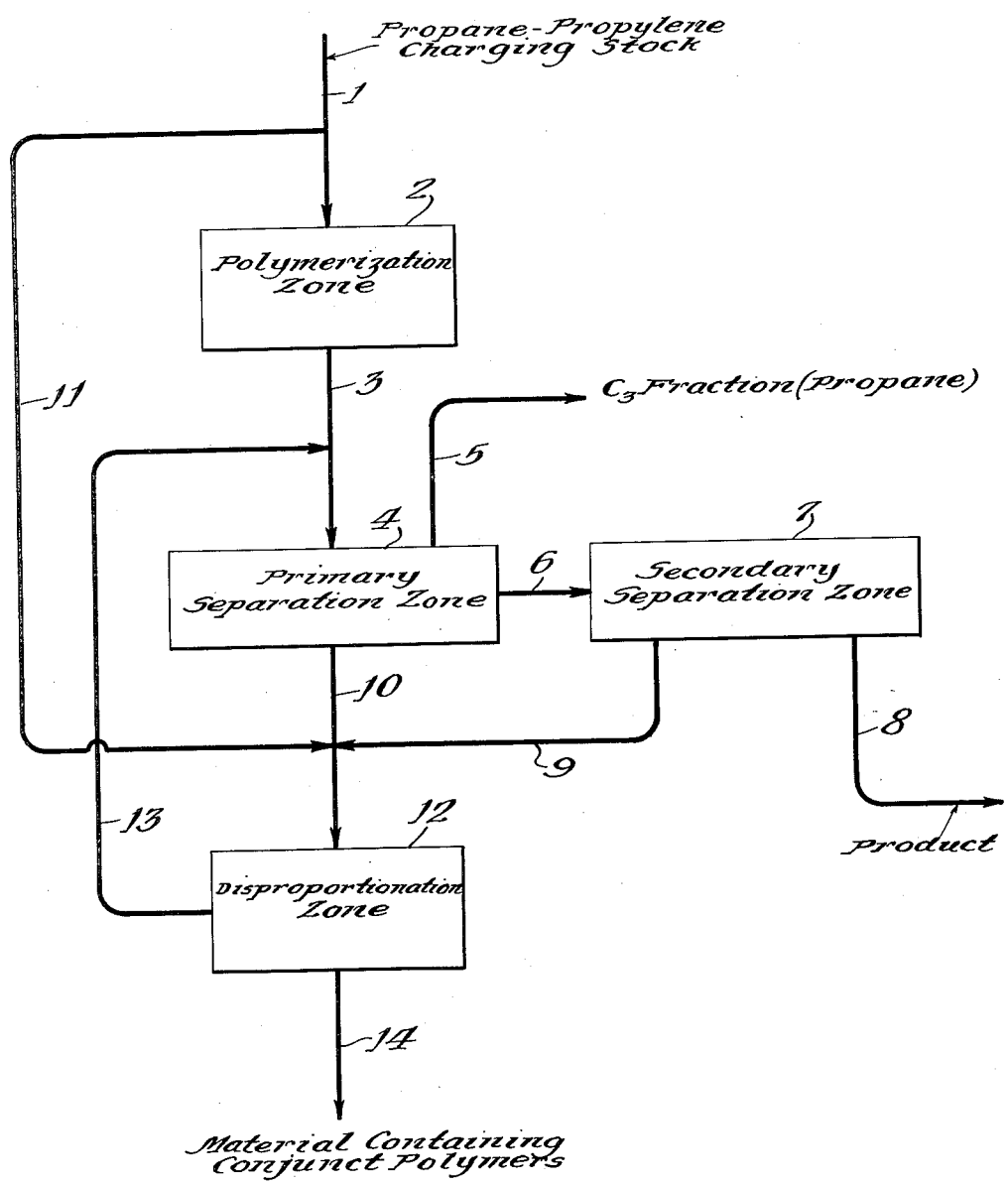
Inventor:
Joseph A. Chenicek
By: Maynard P. Venema
Chester J. Giuliani
Attorneys Patented Oct. 14, 1952

2,614,137

UNITED STATES PATENT OFFICE 2,614,137

PRODUCTION OF SELECTIVE OLEFINIC POLYMERS

Joseph A. Chenicek, Riverside, Ill., assignor to Universal Oil Products Company, Chicago, Ill., a corporation of Delaware Application November 28, 1947, Serial No. 788,635

10 Claims. (Cl. 260—683.15)

This invention relates to a process for the polymerization of olefinic hydrocarbon monomers to produce thereby selective polymers having a particular range of molecular weights suitable for specific purposes. The process is especially adapted to the production of long chain olefinic polymers of relatively straight chain structure containing from about 10 to about 15 carbon atoms per molecule utilizable with particular advantage in the alkylation of aromatic hydrocarbons to form alkylates in which the alkyl group of the resultant alkyl aromatic hydrocarbon contains the same number of carbon atoms and is of the same general configuration as the olefinic polymer utilized as the alkylating agent. The latter alkylates upon sulfonation followed by neutralization of the resulting sulfonic acids produces materials characterized as highly effective detergents in either soft or hard water or in acidic aqueous solutions. In some cases the olefin polymers themselves may be sulfated to produce detergents and wetting agents. In its more specific aspects the invention concerns a combination polymerization-disproportionation process for the production of olefin polymers having a specific range of molecular weights. The polymerization stage of the process produces a series of polymers varying in molecular weight over a rather broad range of values. The disproportionation stage provides a reaction in which those polymers present in the polymerization product having molecular weights above and below the polymer desired are commingled and reacted at selected conditions in the presence of certain catalytic agents to effect an averaging of the molecular weights of the polymers charged, thereby enhancing the yield of the polymer of desired molecular weight.

In the polymerization of olefinic monomers, whether effected thermally or in the presence of particular polymerization catalysts generally known to the art, a product containing polymers of varying molecular weight, up to the normally solid polymeric hydrocarbons, is formed during the polymerization reaction. Although polymerization conditions may be to some extent selected to minimize the proportion of said high molecular weight polymers in the product, such methods are not entirely effective in eliminating all polymers above the particular molecular weight desired. It has been observed, and these observations have been made the basis of the present invention, that when a particular polymer or range of polymers of a specific molecular weight is desired, the polymers of higher and lower molecular weight present in the total product of the polymerization reaction, together with additional monomer if desired, may be averaged by means of a catalytic reaction herein referred to as a disproportionation reaction at selected conditions to form a product containing an appreciable proportion of said desired polymers. By virtue of the provision for continuously recycling said higher and lower polymers to the disproportionation reaction in accordance with the present process, a substantially greater proportion of the monomer charged may be converted into the particular desired polymer product than in the case of a simple polymerization process wherein the additional disproportionation stage is omitted. By means of the present process the necessity of accepting a portion of the product yield in the form of undesirable polymers is obviated and the disposal of the undesired polymers through secondary channels, often to a considerable disadvantage, is eliminated. The primary object of the invention, therefore, is to provide a process, including a polymerization stage thereof whereby substantially all of the monomer olefins charged thereto are converted into a polymer product having a specified molecular weight, intermediate between the low and high polymers formed in said polymerization, thus providing a process wherein a nearly quantitative conversion of the monomer charge to the desired polymer or a fraction containing a particularly desired range of polymers is obtained.

Selective polymerization is effected in accordance with the present invention by means of a combination process which comprises polymerizing in a primary stage of the process an olefin monomer hydrocarbon containing from 3 to about 5 carbon atoms per molecule in the presence of a solid polymerization catalyst, separating a desired polymer fraction therefrom, subjecting residual polymers of higher and lower molecular weight than said desired polymer fraction to a secondary disproportionation reaction, separating said desired polymer from the product of said disproportionation reaction and recycling polymers having molecular weights higher and lower than said desired polymer to the disproportionation reaction.

In accordance with a more specific embodiment of the invention a propylene polymer fraction broadly characterized as a propylene tetramer, boiling from about 170° to about 225° C. is produced by a process which comprises polymerizing a $C_3$ hydrocarbon fraction containing propylene in the presence of a solid phosphoric acid catalyst at a temperature of from about 125° to about 275° C., at a pressure from atmospheric up to about 130 atmospheres and at a charging rate corresponding to a liquid hourly space velocity of from about 0.1 to about 10 volumes of $C_3$ monomer per volume of catalyst per hour, fractionating the product thereof to separate a fraction boiling below about 170° C., fractionating the remaining polymers to separate a fraction boiling from 170° to about 225° C., charging said fractions boiling below about 170° C. and the fraction boiling at a temperature higher than about 225° C., together with $C_3$ monomer charging stock in an amount of from about 10 to about 30% by weight of said combined polymer fractions into a disproportionation reactor containing a silica-alumina composite catalyst at a liquid hourly space velocity of from about 0.1 to about 5 volumes per volume of catalyst per hour at a temperature of from about 200° to about 500° C. and at a pressure of from about 5 to about 20 atmospheres, fractionating the disproportionated polymer fraction therefrom boiling from about 170° to about 225° C. and recycling higher and lower polymers than the polymers contained in said last mentioned fraction to said disproportionation reaction.

Other objects and embodiments of the invention referring to specific catalysts, charging stocks and to alternative means of effecting the present combination process will be hereinafter referred to in greater detail in the following further description of the invention.

The olefinic monomers utilizable as charging stock in the polymerization stage of the present process, although theoretically may comprise any polymerizable mono-olefinic hydrocarbon, it is generally preferred to utilize those olefin monomers which not only form relatively stable polymers at relatively high temperatures (for example at sulfonation or alkylation temperatures) but which, on the other hand, do not polymerize in large part to form excessively high molecular weight normally solid products such as waxes, resins, etc. In general, the preferred olefin monomers comprise the olefinic hydrocarbons represented by the empirical formula: $C_nH_{2n}$, wherein $n$ is a whole number of from 3 to about 5 inclusive and where $C_nH_{2n}$ is preferably a normal olefin. The preferred type of olefin monomer charging stock utilizable in the present process depends upon the use to be made of the polymeric product. For example, in the production of motor fuel components, the charge may contain one or more of the various classes of olefins such as tertiary or normal olefins; also the charge may comprise a mixture of monomers having various molecular weights including components of more than 5 carbon atoms per molecule such as the olefinic gaseous fraction recovered from a thermal or a catalytic hydrocarbon cracking process. For the production of olefinic polymers having a relatively straight chain configuration, required, for example, in the alkylation of aromatic hydrocarbons to form detergents of the alkyl aryl sulfonate type and also for the production of detergents of the long chain alcohol sulfate type by sulfation of the olefinic polymer, the preferred olefin monomer charge is a normal olefin containing from 3 to about 5 carbon atoms per molecule of monomer. Other specific olefins or mixtures thereof may be employed for particular purposes and it is not intended, in specifying the preferred monomers containing from 3 to about 5 carbon atoms per molecule, to limit the application of the present process exclusively to said preferred olefins.

One of the principal applications of the present process is for the production of relatively straight chain olefin polymers containing from about 10 to about 15 carbon atoms per molecule which may be utilized to alkylate aromatic (preferably benzenoid or monoalkyl benzenoid) hydrocarbons to produce the corresponding alkyl aromatic product wherein the alkyl group contains the same number of carbon atoms as the olefinic polymer utilized as alkylating agent. The resulting alkylate upon sulfonation, followed by neutralization of the resulting sulfonic acid product forms a valuable detergent which may be effectively utilized in either hard or soft water. Another type of detergent which may utilize a long chain olefin polymer as charging stock is characterized as an alkanol sulfate containing from about 8 to about 15 carbon atoms per molecule and formed by the sulfation of the olefin having a corresponding number of carbon atoms per molecule and neutralization of the resulting sulfate ester. The above specified monomers containing from 3 to about 5 carbon atoms per molecule preferably propylene, are preferred herein not only because of the formation of relatively straight chain polymers therefrom but as an additional reason for their preference, the polymers formed from the low molecular weight monomers do not appear in the form of scattered isomers. On the other hand, the polymeric products of the higher molecular weight monomers include a greater proportion of isomers, presenting a greater difficulty of sepration into fractions containing polymers of similar molecular weights. Ethylene is likewise not a preferred olefinic charging stock because of its tendency to form a relatively high proportion of conjunct polymerization products, of saturated and/or cyclic character upon polymerization in accordance with the present process.

The polymerization stage herein provided is preferably catalytic, and the preferred catalysts utilizable to effect polymerization are characterized broadly as "solid" catalysts. Although certain liquid regents (generally including the mineral acids of high concentration) are known to have the ability to polymerize olefin monomers by methods not contemplated herein, the operation of the present process is necessarily dependent upon the selected solid catalyst being distributed in the polymerization zone as discrete solid particles in order to provide for direct fractionation of the liquid and vapor products of reaction as the latter exit the polymerization reactor. The direct fractionation of the polymerization product would not be feasible were said liquid polymerization catalysts to be employed in the latter type of operation, since liquid phase conditions would necessarily have to be maintained during polymerization and to separate the liquid polymer product from the acid catalyst prior to fractionation thereof would involve heating the reaction mixture to high temperatures at which sulfonation, decomposition and other foreign reaction would occur. Thus, the polymerization process herein contemplated, whereby the liquid and vapor products of the reaction are subsequently fractionated involves a continuous withdrawal of a vapor phase from the top of the polymerization reactor and a liquid phase withdrawn substantially simultaneously from the bottom of the polymerization zone containing the solid catalyst particles. The polymerization catalyst particles for this type of operation are usually maintained in the reactor as a stationary bed, although it is also within the scope of the present operation to introduce the catalyst in the form of finely divided particles with the gaseous charging stock into the polymerization reactor at a relatively high velocity such that the catalyst particles remain suspended within the gaseous charge, the latter type of operation being generally known to the art as a fluidized method of contacting the charging stock and catalyst.

Among the solid polymerization catalysts utilizable in the present process are included the pyrophosphoric acid salts of the metallic elements in the right-hand columns of groups I and II of the periodic table, particularly the metals: zinc, cadmium, copper and mercury, the salts being desirably deposited upon carrying or spacing materials such as silica gel particles, alumina, firebrick, kieselguhr, etc. Other utilizable catalysts, particularly for fixed or moving bed polymerization operations, comprise the refractory oxides of metals of group IV of the periodic table composited with or deposited on silica and/or alumina. Typical of the latter are the silica-zirconia composites with or without added alumina containing from about 10 to about 15% of zirconia and/or alumina. A particularly preferred solid polymerization catalyst is the composite known generally in the art as the "solid phosphoric acid catalyst" consisting of a precalcined mixture of a suitable phosphoric acid, such as pyrophosphoric acid, and a siliceous absorbent such as kieselguhr, silica spheres, etc., the preparation of which is described in U. S. Patent No. 1,993,513 and others. The latter composite of a siliceous material and a phosphoric acid is sometimes also referred to in the art as a silico-phosphate composition. Of the above generally broad group of solid polymerization catalysts, the so-called solid phosphoric acid catalyst and the metallic pyrophosphate salts are preferred, the two types being referred to herein as phosphate-containing catalysts.

The polymerization of the olefinic monomers containing from 3 to about 5 carbon atoms per molecule is effected in a continuous method of operation by charging the monomer in the gaseous state into a suitable polymerization reactor preferably containing a fixed bed of the above solid polymerization catalyst maintained at a temperature of from about 125° to about 275° C. and at a pressure of from about 50 to about 130 atmospheres, preferably at a temperature of from about 175° to about 250° C. and at pressures in the neighborhood of about 70 atmospheres. The monomer charging stock in the gaseous state is charged at a rate corresponding to a liquid hourly space velocity of from about 0.1 to about 10 volumes of liquid monomer per volume of catalyst per hour. In order to obtain a relatively high yield of polymers boiling from about 170° to about 225° C. and containing from about 10 to about 15 carbon atoms per molecule, it is generally necessary to control the water content of the monomeric olefin charging stock at a certain optimum value generally not exceeding about 0.03 mol percent thereof and preferably not more than about 0.01 mol percent. "Bone dry" charging stocks, on the other hand, are likewise not preferred. Where it is preferred to produce an olefinic polymer product containing from about 10 to about 15 carbon atoms per molecule, a monomer charging stock containing up to preferably 0.01 mol percent of water is preferred.

By means of the polymerization reaction hereinabove provided, a substantial proportion of the olefinic monomer charge is converted into polymers of a wide range of molecular weights, including the dimers, trimers, tetramers, pentamers and higher boiling polymers of the monomeric olefin. When the desired product of the reaction is an intermediate polymer between the high and low extremes of the polymers produced in the reaction, as for example, when the polymer is ultimately to be utilized as an alkylating agent to form a detergent intermediate, the polymers of higher and lower molecular weight than the desired polymer normally present in the polymerization product in considerable amounts are essentially unwanted by-products of the reaction, and must be disposed of through suitable incidental channels. The present method of operation provides a process for separating the desired polymer from the product of the polymerization reaction and subsequently treating the fractions containing polymers of higher and lower molecular weight than the desired polymer in a so-called "disproportionation" reaction to increase the yield of said desired polymer.

In the disproportionation or secondary stage of the process, in the order of reaction, comprised within the combination process herein provided, the size of the individual molecules charged therein are, in effect, averaged, such that the product comprises compounds of molecular size (that is, the number of carbon atoms contained therein) intermediate between the extremes in molecular size of the compounds charged to the disproportionation reaction. The proportion of product molecules of any given molecular size intermediate between said extremes formed in the disproportionation reaction is dependent upon the weight ratio of compounds above and below the median molecular weight of the compounds charged therein. The mechanism of reaction is believed to be essentially a combination of substantially simultaneous reactions including hydrogen transfer, cracking and polymerization, yielding a product containing hydrocarbon compounds varying in molecular weight over the entire range between the extremes in molecular weights of the polymers subjected to the disproportionation reaction. It has been observed that the product of the reaction also contains a small proportion of saturated compounds formed by virtue of the hydrogen transfer reactions during the process.

The charge to the reaction which comprises not only said polymers above and below the molecular weight of the desired polymer may also include monomeric olefins, up to about 30% by weight of the polymers charged into the reactor, to provide a component which will average with the low polymers (copolymerize therewith) to form a copolymer of the ultimately desired molecular weight. Thus, the charging stock to the disproportionation reaction in the preferred type of operation contains the monomeric olefin together with dimers, trimers, pentamers, etc., which yields a product thereof containing a large proportion of tetramer, by copolymerization, for example, of a monomer with a trimer, polymerization of a dimer, cracking of a pentamer to yield a tetramer and monomer, etc., especially when reaction conditions, catalysts, etc., are selected to enhance the formation of said tetramer.

The disproportionation reaction for producing a $C_3$ tetramer, for example, or a $C_4$ or $C_5$ trimer having a boiling range from about 170° to about 225° C., suitable for the production of a detergent alkylate may be carried out in the presence of a suitable catalytic agent at temperatures of from about 200 to about 500° C., preferably between about 300 to about 400° C., the particular temperature utilized depending upon the catalyst present in the disproportionation reactor. The reaction may be effected at atmospheric or slightly superatmospheric pressures of from about 5 to about 20 atmospheres, preferably at about 10 to about 15 atmospheres. Catalysts which may be employed in the reaction include siliceous adsorbents such as fuller's earth and kieselguhr as well as other forms of silica utilized as such or composited with other metallic oxides generally selected from the oxides of metals of groups II, III and IV of the periodic table, particularly such composites as silica-alumina, silica-magnesia, silica-zirconia, silica-thorium oxide, etc. Still another catalyst utilizable in the disproportionation reaction is the solid phosphoric acid composite catalyst heretofore referred to as a suitable polymerization catalyst. Depending upon the catalyst utilized, the temperature of the disproportionation reaction may be effected within various ranges. In the case of the relatively active refractory oxide composites, temperatures of from about 300° to about 500° C. have been found to be satisfactory. On the other hand, when utilizing a more temperature-sensitive catalyst such as the solid phosphoric acid composite, temperatures of from about 200° to about 300° C. are preferred, temperatures in the neighborhood of 250° C. being especially desirable for the reaction. The rate of charging the mixture of liquid polymers to the heated disproportionation catalyst may range from about 0.1 to about 5 volumes of polymer liquid per volume of catalyst per hour. The catalyst, when deactivated by reason of the accumulation of heavy polymers or carbonaceous materials on the surface thereof, may be regenerated by treatment with an appropriate solvent or by calcining the catalyst in the presence of air.

As heretofore indicated, the disproportionation product normally contains a small percentage (up to about 2 per cent of the total) of saturated hydrocarbons characterized a conjunct polymers which form by virtue of the hydrogen exchange reactions occurring during disproportionation. Since these saturated hydrocarbons boil at temperatures similar to the boiling points of other fractions of the product and are admixed therewith, their separation from the product by simple fractional distillation is obviously impracticable. In order to prevent their concentration in the system from increasing to the point that a large proportion of the recycled fractions comprises said conjunct polymers, it has been found expedient to withdraw from the recycle stream a sufficient proportion of said recycle that the ratio of conjunction polymers to desired recycle polymers is maintained substantially constant. This may be effected by withdrawing such amount of the total recycle stream as will contain the yield of conjunct polymers produced in the previous disproportionation reaction.

The process flow of the present invention, the apparatus for effecting the desired dual conversion comprising a polymerization reaction and a disproportionation reaction an other embodiments of the invention will be described in greater detail in connection with the accompanying flow diagram. For purposes of simplifying the description, the polymerization stage of the process will be described with reference to the preferred monomeric olefin charging stock (that is, a $C_3$ hydrocarbon fraction containing propylene) and also with reference to the preferred polymerization catalyst, the granular solid phosphoric acid catalyst which is desirably maintained in the polymerization reactor as a fixed bed of catalyst in relation to the entering charging stock. Also as a means of simplifying the diagram further, the process represented thereby will be described with reference to the production of a so-called propylene tetramer fraction, boiling for example, from about 170° to about 225° C. The disproportionation stage of the reaction will be presented diagrammatically with reference to the embodiment of the present invention wherein the higher and lower boiling polymers than said propylene tetramer will be charged together with a portion of the $C_3$ monomer charging stock in the presence of a solid disproportionation catalyst consisting, for example, of a silica-alumina composite. It is to be emphasized, however, that in thus describing the diagram in relation to the specific charging stocks and catalysts enumerated above, it is not intended to limit the generally broad scope of the combination of reaction stages to said specific members.

Referring to the diagram, a propane-propylene containing charging stock, separated for example, from the gaseous effluent of a prior hydrocarbon conversion operation, such as a thermal cracking reaction, is introduced into the process through line 1 at a pressure from atmospheric up to about 130 atmospheres and at a temperature of from about 125° to about 275° C. into polymerization zone 2 containing the preferred solid phosphoric acid catalyst maintained in the polymerization reactor as a fixed bed. The total product of the polymerization reaction, a portion of which may be in liquid state as the reaction temperature maintained in polymerization zone 2, is withdrawn from polymerization reactor 2 through line 3 and discharged into separation zone 4 which may comprise one or a series of simple or fractional distillation towers for separating the polymeric products formed in zone 2 into particular fractions in accordance with their boiling points. The total product of polymerization zone 2 is usually separated initially into three fractions, a normally gaseous fraction, which is withdrawn from zone 4 through line 5, a normally liquid intermediate polymer fraction containing the desired polymer as well as polymers boiling below said desired polymer is withdrawn from zone 4 through line 6, and a high boiling polymer fraction containing polymers of higher molecular weight than said desired polymer is withdrawn from zone 4 through line 10. Said normally gaseous fraction comprising unconverted propylene of the monomer charging stock and inert propane is discharged from the process through line 5, or a portion thereof may be recycled to charging line 1 for the purpose of diluting the propylene contained in said monomer charging stock. The normally liquid intermediate polymer fraction which boils up to about 225° C. and contains propylene dimers, trimers and tetramers is diverted through line 6 into secondary separation zone 7 wherein said liquid fraction containing the above polymers is distilled to separate the desired propylene tetramer product boiling from about 170° to about 225° C. therefrom. Said desired tetramer fraction is withdrawn from separation zone 7 through line 8 and may be discharged into auxiliary equipment, not shown on the diagram, wherein said fraction is utilized as an alkylating agent for the production of detergent alkylates or into a sulfonation reactor for conversion into an alcohol sulfate containing from 10 to about 15 carbon atoms per molecule.

The fraction boiling up to the boiling range of the propylene tetramer product fraction (about 170° C.) and comprising the low boiling ends of the material charged into secondary separation zone 7 containing propylene dimer and trimer as well as any intermediate or lower boiling hydrocarbons is removed from zone 7 through line 9 and is commingled in line 10 with the polymers boiling higher than the desired propylene tetramer (about 225° C.) removed from zone 4 through line 10. The polymers boiling above and below the propylene tetramer product boiling range admixed in line 10 are further commingled with a portion of the C3 monomer charging stock which is diverted from line 1 in controlled amounts up to about 30 weight per cent of the combined high and low polymers through line 11 which joins line 10 so as to obtain mixing of the reactants prior to charging said mixture through line 10 into disproportionation reactor 12. The combined charging stock to the disproportionation reaction is heated prior to being charged into zone 12 to a temperature of from about 200° to about 500° C. and is charged therein at a pressure of from about 5 to about 20 atmospheres. Zone 12 is desirably a fixed bed reactor containing a solid disproportionation catalyst such as the preferred silica-alumina composite in the form of discrete particles distributed throughout the internal volume of the reactor. The disproportionation reaction product is removed from zone 12 through line 13 and is diverted into primary separation zone 4 by connection of said line 13 with line 3, conveying the disproportionation reaction products into zone 4 for separation thereof into fractions, one of the principal fractions of which comprises the desired propylene tetramer fraction boiling from about 170° to about 225° C. hereinabove referred to.

Although the entire product from the disproportionation reaction may be recycled into the process, it has been found desirable for the purpose of preventing a high concentration of conjunct polymers in the recycle stream to separate that portion of the disproportionation reaction product which corresponds to the amount of saturated conjunct polymers contained therein. The product of a typical disproportionating reaction may contain from about 0.1 to about 2% of said conjunct polymers, depending upon reaction conditions, catalyst and other factors involved in the reaction. In order to maintain the concentration of conjunct polymers in the recycled stream constant, therefore, it is contemplated in accordance with the preferred method of operation herein provided to remove from about 1 part to about 20 parts of the total disproportionation reaction product from zone 12 through line 14 to be discharged from the reaction or otherwise separated to recover desirable fractions therefrom.

I claim as my invention:

1. A combination polymerization-disproportionation process for increasing the yield of a desired olefinic polymer from the products of polymerizing an olefinic monomer which comprises polymerizing said olefinic monomer in a first reaction zone in the presence of a solid phosphoric acid catalyst to form a product containing said desired polymer having a molecular weight intermediate between the lower and higher molecular weight polymers contained in said product, separating said desired polymer from said product and subjecting the residual lower and higher molecular weight polymers in admixture to a disproportionation reaction in a second reaction zone in the presence of a catalyst comprising a siliceous adsorbent to average the molecular weights of said latter polymers forming thereby an additional yield of said desired polymer.

2. The process of claim 1 further characterized in that said olefinic monomer is propylene.

3. A process for producing a propylene tetramer fraction boiling from about 170° to about 225° C. which comprises polymerizing a $C_3$ hydrocarbon fraction containing propylene in the presence of a solid phosphoric acid catalyst at a temperature of from about 125° to about 275° C. at a pressure from atmospheric up to about 130 atmospheres and at a charging rate corresponding to a liquid hourly space velocity of from about 0.1 to about 10 volumes of $C_3$ hydrocarbon fraction per volume of catalyst per hour, separating from the products of the polymerization reaction a fraction which boils below about 170° C., separating from the remaining high boiling polymers a propylene tetramer fraction boiling from about 170° to about 225° C., charging said fractions boiling below about 170° C. and the fraction boiling at a temperature higher than about 225° C. at a liquid hourly space velocity of from about 0.1 to about 5 volumes per volume of catalyst per hour at a temperature of from about 200° to about 500° C. and at a pressure of from about 5 to about 20 atmospheres, into a disproportionation reactor containing a silica-alumina composite catalyst, separating from the products of said disproportionation reaction a fraction boiling from about 170° to about 225° C. and recycling higher and lower boiling fractions to said disproportionation reaction.

4. A process which comprises polymerizing an olefinic monomer in the presence of a solid phosphoric acid catalyst at a temperature of from about 125° to about 275° C., a pressure from atmospheric up to about 130 atmospheres and a charging rate corresponding to a liquid hourly space velocity of from about 0.1 to about 10 volumes of olefinic monomer per volume of catalyst per hour, separating from the products of the polymerization reaction polymer fractions of relatively low, intermediate and high molecular weights, recovering the intermediate polymer fraction, and subjecting the polymer fractions of low and high molecular weights in admixture to the action of a solid cracking catalyst comprising silica and alumina at a liquid hourly space velocity of from about 0.1 to about 5 volumes per volume of catalyst per hour, a temperature of from about 200° to about 500° C. and at a pressure of from about 5 to about 20 atmospheres.

5. A process which comprises polymerizing an olefinic monomer in the presence of a solid phosphoric acid catalyst at a temperature of from about 125° to about 275° C., a pressure from atmospheric up to about 130 atmospheres and a charging rate corresponding to a liquid hourly space velocity of from about 0.1 to about 10 volumes of olefinic monomer per volume of catalyst per hour, separating from the products of the polymerization reaction polymer fractions of relatively low, intermediate and high molecular weights, recovering the intermediate polymer fraction, charging the polymer fractions of low and high molecular weights at a liquid hourly space velocity of from about 0.1 to about 5 volumes per volume of catalyst per hour at a temperature of from about 200° to about 500° C. and at a pressure of from about 5 to about 20 atmospheres into a disproportionation reactor containing a composite catalyst comprising silica and a metal oxide selected from the group consisting of alumina, magnesia, zirconia and thorium oxide.

6. The process of claim 1 further characterized in that the second-mentioned catalyst contains a metal oxide selected from the group consisting of alumina, magnesia, zirconia and thorium oxide.

7. The process of claim 5 further characterized in that said olefinic monomer contains from 3 to about 5 carbon atoms per molecule.

8. The process of claim 5 further characterized in that said olefinic monomer is propylene.

9. A process for producing a propylene tetramer fraction boiling from about 170° to about 225° C. which comprises polymerizing a $C_3$ hydrocarbon fraction containing propylene in the presence of a solid phosphoric acid catalyst at a temperature of from about 125° to about 275° C. at a pressure from atmospheric up to about 130 atmospheres and at a charging rate corresponding to a liquid hourly space velocity of from about 0.1 to about 10 volumes of $C_3$ hydrocarbon fraction per volume of catalyst per hour, separating from the products of the polymerization reaction a fraction which boils below about 170° C., separating from the remaining high boiling polymers a propylene tetramer fraction boiling from about 170° to about 225° C., charging said fraction boiling below about 170° C. and the fraction boiling at a temperature higher than about 225° C. at a liquid hourly space velocity of from about 0.1 to about 5 volumes per volume of catalyst per hour at a temperature of from about 200° to about 500° C. and at a pressure of from about 5 to about 20 atmospheres into a disproportionation reactor containing a composite catalyst comprising silica and a metal oxide selected from the group consisting of alumina, magnesia, zirconia and thorium oxide, and separating from the products of said disproportionation reaction a fraction boiling from about 170° to about 225° C.

10. A process for producing a propylene tetramer fraction boiling from about 170° to about 225° C. which comprises polymerizing a $C_3$ hydrocarbon fraction containing propylene in the presence of a solid phosphoric acid catalyst at a temperature of from about 125° to about 275° C. at a pressure from atmospheric up to about 130 atmospheres and at a charging rate corresponding to a liquid hourly space velocity of from about 0.1 to about 10 volumes of $C_3$ hydrocarbon fraction per volume of catalyst per hour, separating from the products of the polymerization reaction a fraction which boils below about 170° C., separating from the remaining high boiling polymers a propylene tetramer fraction boiling from about 170° to about 225° C., charging said fraction boiling below about 170° C. and the fraction boiling at a temperature higher than about 225° C. at a liquid hourly space velocity of from about 0.1 to about 5 volumes per volume of catalyst per hour at a temperature of from about 200° to about 500° C. and at a pressure of from about 5 to about 20 atmospheres into a disproportionation reactor containing a silica-alumina composite catalyst, and separating from the products of said disproportionation reaction a fraction boiling from about 170° to about 225° C.

JOSEPH A. CHENICEK.

REFERENCES CITED

The following references are of record in the file of this patent:

UNITED STATES PATENTS

| Number | Name | Date |
|---|---|---|
| 2,178,808 | Rosen et al. | Nov. 7, 1939 |
| 2,182,617 | Michel | Dec. 5, 1939 |
| 2,385,237 | Stahly et al. | Sept. 18, 1945 |
| 2,409,727 | Bailey | Oct. 22, 1946 |
| 2,486,533 | Mayland | Nov. 1, 1949 |